E. W. OLSON.
POULTRY APPARATUS.
APPLICATION FILED OCT. 5, 1910.

1,023,030.

Patented Apr. 9, 1912.

2 SHEETS—SHEET 1.

WITNESSES

INVENTOR
Edward W. Olson

BY

ATTORNEYS

COLUMBIA PLANOGRAPH CO., WASHINGTON, D. C.

E. W. OLSON.
POULTRY APPARATUS.
APPLICATION FILED OCT. 5, 1910.

1,023,030.

Patented Apr. 9, 1912.
2 SHEETS—SHEET 2.

WITNESSES

INVENTOR
Edward W. Olson
BY
ATTORNEYS

UNITED STATES PATENT OFFICE.

EDWARD W. OLSON, OF WALLA WALLA, WASHINGTON.

POULTRY APPARATUS.

1,023,030.  Specification of Letters Patent.  Patented Apr. 9, 1912.

Application filed October 5, 1910. Serial No. 585,361.

*To all whom it may concern:*

Be it known that I, EDWARD W. OLSON, a citizen of the United States, and a resident of Walla Walla, in the county of Walla Walla and State of Washington, have invented a new and Improved Poultry Apparatus, of which the following is a full, clear, and exact description.

The invention relates to poultry culture, more particularly to poultry nests, and has for an object to provide an apparatus whereby the number of eggs laid by each hen in a flock for a given period can be easily determined. For the purpose mentioned use is made of a casing provided with an entrance and an exit, a perch mounted on the casing, a movable nest in the casing and adapted to operate the perch to close the said entrance when the nest is occupied by a hen, and closures, one of which is adapted to normally close the exit with means for operating the closures to open the exit and close the entrance when an egg engages the said means.

Reference is to be had to the accompanying drawings constituting a part of this specification, in which similar characters of reference denote corresponding parts in all the views, and in which—

Figure 1:
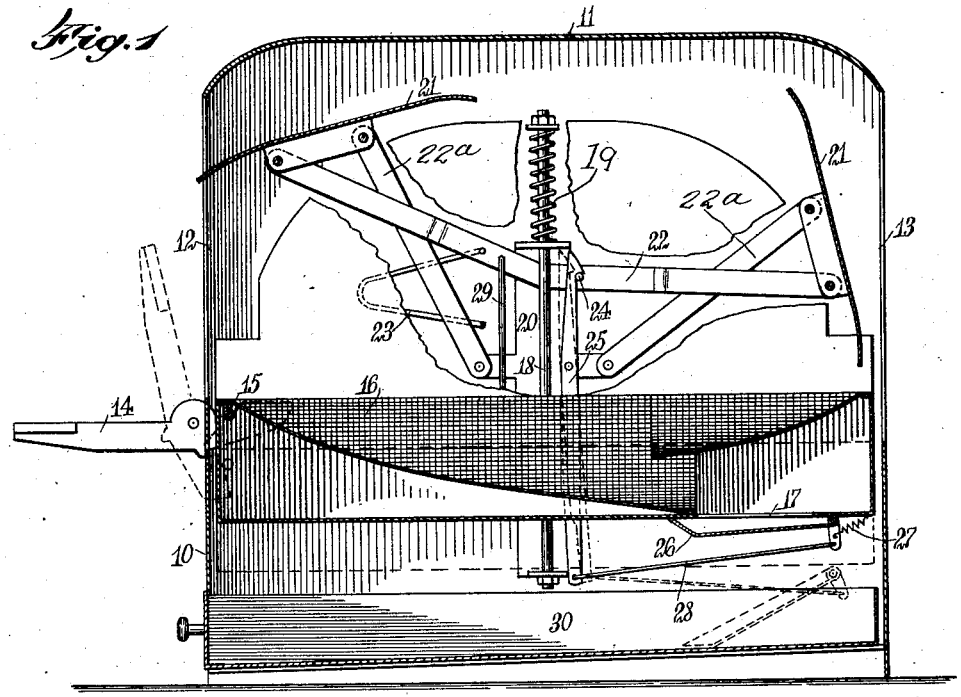
Figure 2:
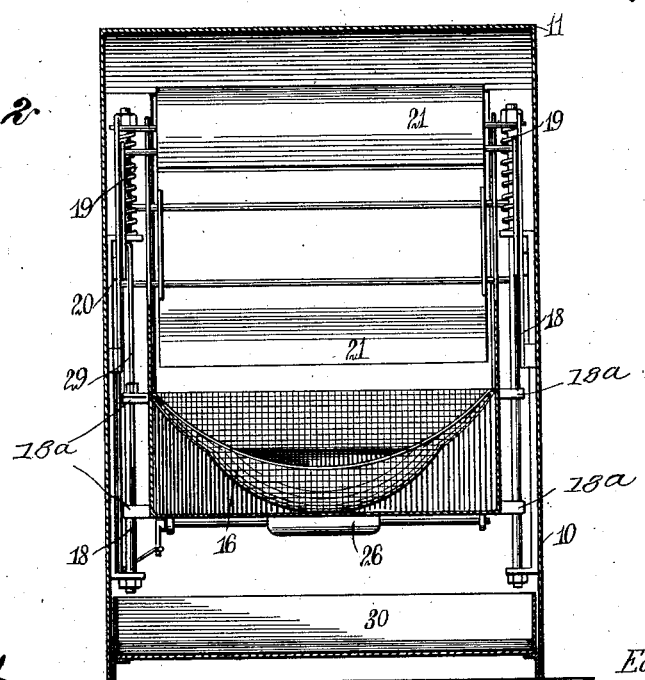
Figure 3:
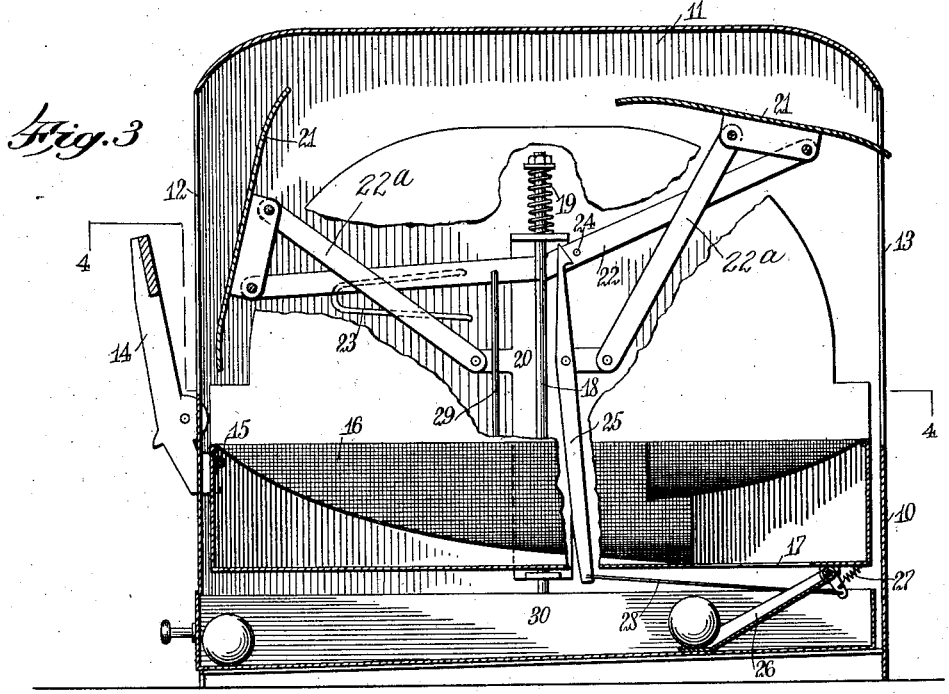
Figure 4:
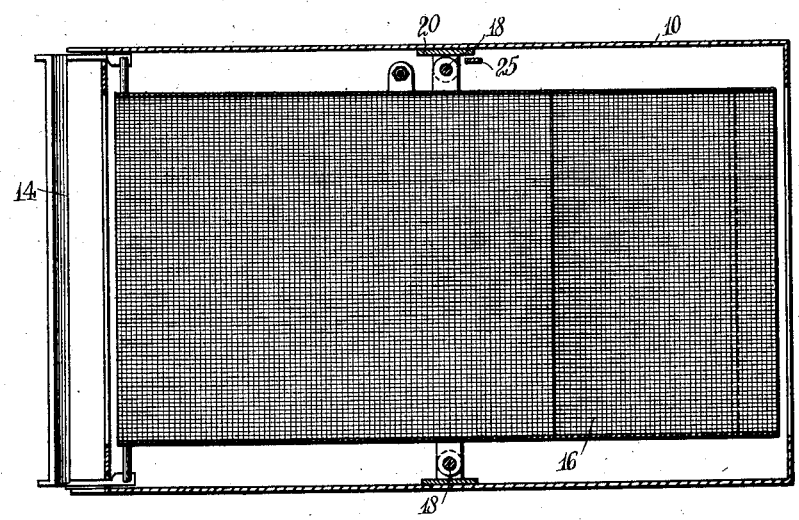

Figure 1 is a sectional side view showing the apparatus in normal or initial position; Fig. 2 is a sectional end view; Fig. 3 is a sectional side view, disclosing the final position of the apparatus, and Fig. 4 is a sectional plan view, taken on the line 4—4 in Fig. 3.

Referring more particularly to the views, I employ a casing 10 having a top 11 provided with an entrance 12 and an exit 13. A perch 14 is mounted to swing on the casing 10 and is engaged by a rod 15 on a nest 16, movably mounted in the casing 10 and provided with an aperture 17 therein. The nest 16 is preferably secured by lugs 18[a] to posts 18 slidably mounted in the casing and engaged by springs 19, so that when a hen occupies the nest, the weight of the hen will move the nest downwardly, and when the hen leaves the nest the springs 19 will return the nest to normal position. Suitable uprights 20 are secured to the casing 10, and mounted to swing thereon are coöperative closures 21, connected by a balance lever 22 and operatively engaged by a spring 23 secured to the lever 22 and the casing 10. The closures 21 are pivoted to the outer ends of the lever 22 and said closures are connected to the uprights 20 by links 22[a] pivoted to the said closures and uprights. A lug 24 is secured to the lever 22 and is adapted to be engaged releasably by a locking bar 25, mounted on one of the uprights 20.

Disposed immediately beneath the aperture 17 is a pan 26, mounted to swing on the casing 10 and engaged by a spring 27. A connecting rod 28 is adapted to connect the pan 26 and the locking bar 25 so that when the pan is moved downwardly the locking bar 25 will release the closures 21.

Secured to the lever 22 and engaging the nest 16 is a rod 29 for returning the closures 21 to their initial position when the hen leaves the nest 16.

Slidably disposed in the lower part of the casing 10 is a drawer 30 adapted to receive the eggs when they roll from the pan 26.

Now assuming that the apparatus described, is in the position shown in Fig. 1, when a hen flies onto the perch 14 and stepping through the entrance 12, occupies the nest 16, the weight of the hen will move the nest downwardly and thus raise the perch 14 to temporarily close the entrance 12 as will be seen in dotted lines in Fig. 1 and in Fig. 3. When the hen after occupying the nest, lays an egg, the said egg passes through the aperture 17 and engages the pan 26 which, owing to the weight of the egg, moves downwardly thus actuating the closures 21 and the said closures actuated by the spring 23 move to open the exit 13 and close the entrance 12. The hen then passes through the exit and as she steps from the edge of the nest, the same moves upwardly to release the perch which returns to its initial position and at the same moment, the rod 29 moved upwardly by the nest 16, returning to its initial position, actuates the closures so that they are also returned to their initial position, and locked in place by the locking bar 25 engaging the lug 24. The apparatus is now prepared to receive another hen and the mentioned operation is repeated. As the eggs roll from the pan 26, after operating the same, they roll into the drawer 30 from which they can be easily removed.

From the foregoing description, it will be seen that an efficient and substantially automatic poultry apparatus is provided and although I have shown a particular construction of the same it will be understood that the scope of the invention is defined in the appended claims.

Having thus described my invention I claim as new and desire to secure by Letters Patent:

1. A poultry apparatus comprising a casing having an entrance and an exit, a vertically movable and spring actuated nest mounted in the casing and having an opening therein, a pivoted perch exterior of the casing and operated by the nest to swing it into approximately vertical position in front of the entrance to the casing when the nest is depressed by the entrance of a hen, swinging closures mounted in the casing for alternately opening and closing the entrance and exit of the casing, a movable egg receiving member below the opening of the nest, means whereby when an egg engages the said member the closures will be swung to close the entrance and open the exit, and means whereby when a hen leaves the nest the closures and perch will be swung to their initial positions.

2. A poultry apparatus comprising a casing having an entrance and an exit, a vertically movable and spring actuated nest mounted in the casing and having an opening in its bottom, a pivoted perch exterior of the casing adjacent to the entrance thereof and operated by the nest to swing it into approximately vertical position or into a horizontal position, swinging and spring actuated closures mounted in the casing for alternately opening and closing the entrance and exit of the casing and a pivoted spring actuated, egg receiving member below the opening of the nest, a locking device controlled by the egg receiving member for holding the closures in position to open the entrance and close the exit, and means controlled by the nest to swing the closures to their initial positions.

3. A poultry apparatus, comprising a casing having an entrance and exit, a vertically movable and spring actuated nest in the casing and having an opening therein, pivoted and spring pressed levers mounted in the casing, closures at the ends of the levers, a locking member engaging one of the levers to hold it in position, a movable egg receiving member mounted below the opening of the nest, a connection between the egg receiving member and the locking member whereby the locking member will be operated to release the said levers when the egg receiving member is depressed by an egg, and a member carried by one of the levers and adapted to be engaged by the nest in its upward movement.

4. A poultry apparatus, comprising a casing having an entrance and an exit, a vertically movable and spring actuated nest mounted in the casing and having an opening therein, pivoted and spring pressed levers mounted in the casing, one of the levers being provided with a projection, closures mounted on the ends of the levers, a pivoted locking bar for engaging the said projection, a pivoted and spring actuated egg receiving pan mounted below the opening of the nest, a rod connecting the lower end of the locking bar with the pan, and a rod carried by one of the levers and adapted to be engaged by the nest in its upward movement.

5. A poultry apparatus, comprising a casing having an entrance and an exit, uprights in the casing, a vertically movable and spring actuated nest carried by the uprights and having an opening therein, levers pivoted to the uprights, one of the levers being provided with a projection, closures pivoted between the ends of the levers, links pivoted to said closures and uprights, a locking bar pivoted to the uprights, and adapted to engage the said projection, a pivoted and spring pressed egg receiving pan in the nest below the opening thereof, a rod connecting the pan with the lower end of the locking bar, and a rod secured to one of the levers and adapted to be engaged by the nest when in its uppermost position.

6. In a poultry apparatus, a casing having an entrance opening in its front, a vertically sliding and spring actuated nest in the casing and provided with projections at its sides adjacent to the front end thereof, and a perch pivoted to the exterior of the casing below the entrance opening and provided with side members extending into the casing on opposite sides of the nest and engaged by the projections thereof whereby when the nest is depressed it is swung upward in front of the said opening.

In testimony whereof I have signed my name to this specification in the presence of two subscribing witnesses.

EDWARD W. OLSON.

Witnesses:
ROBERT E. MCNAMARA,
EUGENE HARRIS.

Copies of this patent may be obtained for five cents each, by addressing the "Commissioner of Patents, Washington, D. C."